May 10, 1955 J. T. GONDEK 2,707,817
CUTTING TOOLS
Filed Nov. 9, 1951
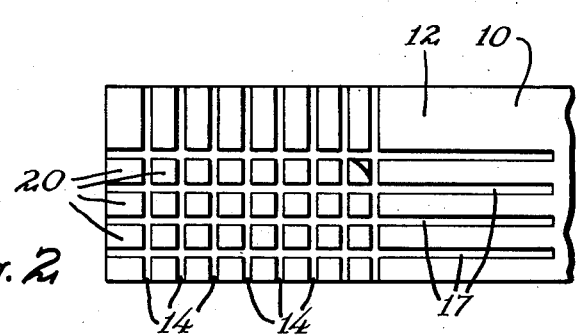
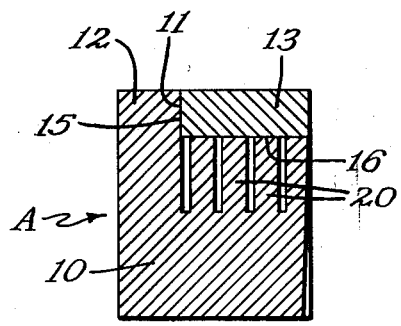
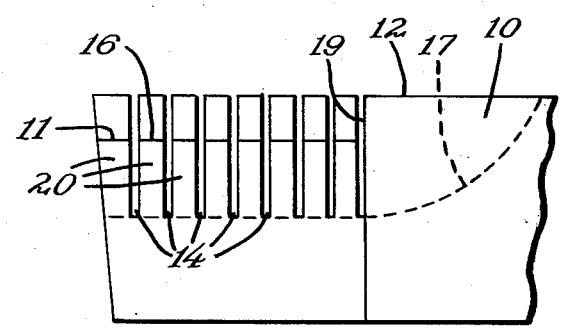
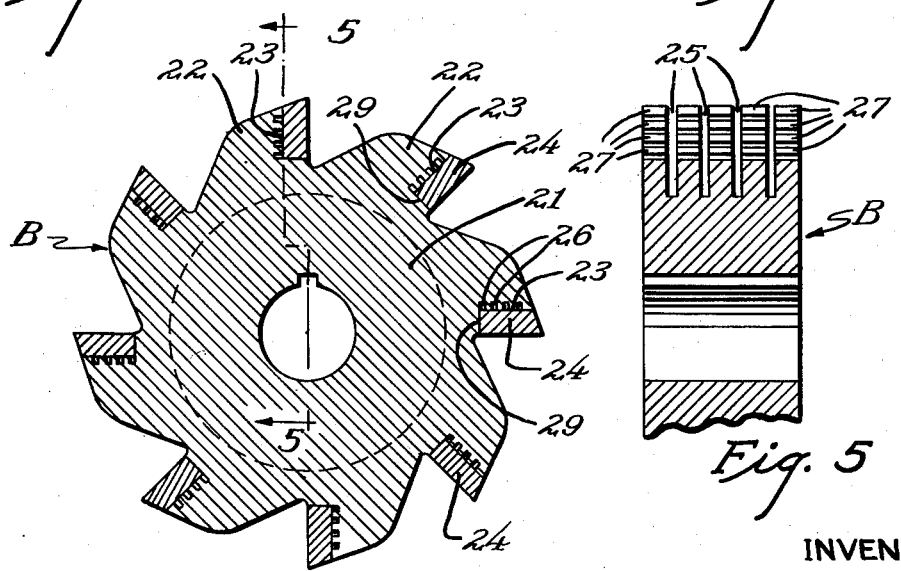
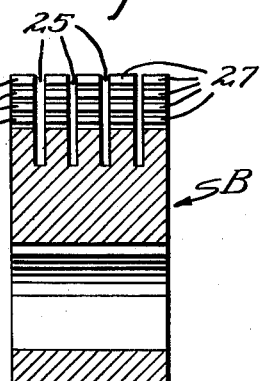
INVENTOR
John T. Gondek
BY Robert M. Dunning
ATTORNEY

United States Patent Office 2,707,817
Patented May 10, 1955

2,707,817

CUTTING TOOLS

John T. Gondek, Minneapolis, Minn.

Application November 9, 1951, Serial No. 255,683

8 Claims. (Cl. 29—103)

This invention relates to an improvement in cutting tools and deals particularly with a means of supporting extremely hard material used on the cutting edges of such tools.

In the production of tools for cutting metals and similar materials, it is common practice to employ as the body of the tool, a relatively tough and soft material and to mount thereupon a cutting edge portion of extremely hard metal. The purpose of producing cutting tools of a plurality of metals is manifold. In the first place, the metal usually used to form the body of such tools is relatively low in cost and will withstand certain types of strain more effectively than the extremely hard metal used as the cutting edges. This practice has resulted in certain difficulties. The hard material employed as the cutting edge often expands and contracts a different amount from the metal supporting the cutting edge. The hardened metal forming the cutting edge is also directly subjected to the forces creating heat while the supporting metal is not. Therefore, the hardened metal often loosens from the supporting metal or causes cracking, chipping or breaking of one portion or another of the tool.

An object of the present invention resides in the provision of a support for the relatively hard material used as the cutting edge of cutting tools and the like which will permit a certain amount of expansion and contraction of one material relative to the other. I have found that the supporting material may be firmly and securely anchored to the material forming the cutting edge without separation between the two materials and without danger of cracking or chipping either of the materials. As a result cutting tools may be provided which will stand up in use for much longer periods of time than cutting tools made in the usual manner.

A feature of the present invention resides in providing a support for the hardened metal employed as the cutting edge of cutting tools which is cut or grooved in such a manner that the hard cutting edge portion is supported upon a series of spaced pillars or projections. These pillars or projections may flex slightly in any direction without cracking the body of material forming the support. As a result one of the materials may expand or contract to a substantially greater degree than the other without damaging the tool.

A feature of the present invention lies in the provision of a tool including a supporting portion and a hardened cutting edge portion. The cutting edge portion is anchored to the supporting portion in any suitable way usually by brazing. However, prior to the mounting of the hardened portion the portion of the support underlying the hardened material is cut or grooved in a manner to form a series of spaced posts or projections of relatively small cross section. The hardened cutting material is next anchored to the ends of these posts or projections. The supporting material thus cushionally supports the hardened cutting material and permits the necessary relative expansion and contraction of the two metals.

These and other objects and novel features of my invention will be more clearly and fully set forth in the following specification and claims.

In the drawings forming a part of the specification:

Figure 1 is a sectional view of a cutting tool having a length of hardened material anchored thereto to form a cutting edge.

Figure 2 is a plan view of a portion of the tool illustrated in Figure 1.

Figure 3 is an elevational view of the tool support illustrated in Figure 2.

Figure 4 is a sectional view through a rotary cutting tool showing a series of cutting teeth of hard material mounted thereupon.

Figure 5 is a sectional view through a portion of the cutting tool illustrated in Figure 4 before the hard material is attached thereto, the position of the section being indicated by the line 5—5.

Cutting tools are produced in an extremely large number of specific forms and shapes. The particular types of cutting tools illustrated in the accompanying drawings are merely illustrative of certain of these tools. However, it is believed that the theory of the invention will be readily apparent from the drawings and the following description.

The cutting tool A shown in Figures 1, 2, and 3 includes an elongated bar 10 of alloy steel or the like. A notch 11 of generally rectangular form is cut in the upper surface 12 of the bar 10. This rectangular notch is designed to accommodate a relatively small bar 13 of hard metal, such as is commonly used as the cutting edge of tools of this type. The bar 13 is anchored in place in any suitable manner such as by welding or brazing the parts together to form a rigid and solid construction.

It is usual practice to anchor the bar 13 to a solid continuous surface on the bar 10, this surface possibly comprising the base of a notch such as 11 or possibly comprising the upper surface of the bar 10. Obviously the notch 11 provides a firmer support for the bar of cutting material and the walls of the notch 11 assist in holding the bar of cutting material in place.

Prior to the attachment of the bar 13 to the supporting bar 10, a series of grooves 14 are formed in parallel relation through the bar. These grooves 14 may be provided merely on the surface of the notch 11, but preferably extend into the upper surface 12 of the cutting tool so that the shoulder 15 defining one wall of the notch 11 is grooved as well as the base 16 of the notch. In the tool illustrated the grooves 14 extend from side to side of the bar 10, such a construction often being preferable from a standpoint of convenience in manufacture.

As illustrated in Figures 2 and 3 of the drawings, the base surface 16 of the notch 11 is grooved longitudinally of the bar 10. A series of spaced grooves 17 is illustrated, the grooves 17 being shown tapered in depth beyond the shoulder 19 forming the end of the notch 11. Thus the grooves 17 not only extend throughout the length of the notch 11, but also extend into the body of the bar 10 beyond the notch 11.

It will be seen from Figure 2 of the drawings that the grooves 14 and 17 intersect to form a series of generally rectangular supporting posts 20 which are arranged in spaced relationship. These posts are of proper depth to permit the required flexing upon expansion and contraction of the bar 13 relative to that of the bar 10. At the same time the grooves 14 and 17 are not sufficiently deep to weaken the support sufficiently to cause likelihood of breakage of the supporting portion of the tool.

The bar 13 is next anchored to the bar 10 in the conventional manner. When once attached the tool may be ground or sharpened in the usual manner. However, it is found that in the use of the tool, the expansion of one material at a greater degree than the other will merely flex the supporting posts 20 laterally within the elastic limits of the material, thus preventing cracking, chipping or breaking of the tool during use. As the strain upon the cutting edge of the tool is largely absorbed by the supporting posts in a direction longitudinal of these posts, there is little tendency for the posts to break off or become injured during the use of the tool.

A second general type of cutting tool is indicated at B in Figures 4 and 5 of the drawings. This cutting tool comprises a disc-like body 21 having a series of angularly spaced teeth 22 thereupon. Supporting surfaces 23 are provided on the teeth 22, these supporting surfaces 23 in the particular tool illustrated being parallel to radial planes through the axis of the disc. The supporting surfaces 23 are spaced from these radial planes a distance substantially equal to the thickness of the bars 24 of hard material supported thereupon to form the cutting edges of the tool. As a result the cutting surface of each tooth may be arranged on a radial plane or one nearly radial.

In order to prevent injury to the tool due to unequal expansion and contraction of the supporting material and the cutting material, I provide a series of peripheral grooves 25 in the disc 21 extending through the depth of the teeth 22. I also provide radially spaced grooves 26 arranged in parallel relation at substantially equal intervals from the center of the disc. These transverse grooves and circumferential grooves divide each supporting surface 23 into a series of generally rectangular supporting posts 27 which are spaced by the grooves 25 and 26. In some types of tools it is necessary to have only one set of grooves. This is particularly true when the hard material is relatively long and narrow. While not equivalent to the structure described the anchored surfaces of the bars or tips 13 and 24 could be grooved, rather than the supporting body.

The bars 24 of material forming the cutting edges of the tool are anchored to the supporting surfaces 23 in the manner well known in the art. Preferably the inner edge of each bar 24 abuts against a shoulder such as 29 at the base of each supporting surface 23. Also the bars are usually ground so that the forward edge of each of the bars 24 at its outer extremity is beyond the periphery of any other portion of the bar or tooth. Thus the forward and inner edge of each of the bars forms the cutting edge thereof.

In the use of the tool B the disc is rotated upon a suitable supporting arbor and rotated against the material to be cut, each successive tooth engaging into the material to be cut. Upon expansion and contraction of the hardened cutting material the supporting posts 27 may flex sufficiently to compensate for the difference in the expansion coefficient of the two materials and without exceeding the elastic limit of the supporting material. As a result the cutting material will not cause breakage or chipping of the cutting tool over long periods of service.

In accordance with the patent statutes, I have described the principles of construction and operation of my cutting tools, and while I have endeavored to set forth the best embodiment thereof, I desire to have it understood that obvious changes may be made within the scope of the following claims without departing from the spirit of my invention.

I claim:

1. A cutting tool including a supporting member and a body of relatively hard material attached thereto, the portion of the supporting material beneath the body of the cutting material being divided by intersecting grooves into a series of spaced supports.

2. A cutting tool including a supporting body of relatively soft material having a surface thereupon divided by two series of spaced intersecting grooves into a series of spaced projections, and a tip of relatively harder material attached to said surface and overlying the same.

3. The structure described in claim 2 and in which the spaced grooves of each series are arranged in parallel relationship.

4. A cutting tool including a body of relatively soft material having a notch therein, and a body of relatively hard material supported in said notch and attached to the supporting material, the base of said notch being divided into a series of spaced projections by two series of spaced intersecting grooves.

5. The structure described in claim 4 and in which the notch engages along three adjoining edges of the body of relatively hard material.

6. A cutting tool including an elongated bar of relatively soft material having a notch in one end thereof communicating with a longitudinal edge of the body and with an end thereof, said body having a series of spaced longitudinally extending grooves therein extending through the base of said notch, said body having a series of longitudinally spaced transversely extending grooves therein extending through the base of the notch, and a body of relatively hard material in said notch and secured to the first named body, said body of relatively hard material engaging against the walls of said notch.

7. A cutting tool including a body having a series of angularly spaced teeth thereupon, said teeth each having an attaching surface thereupon arranged in planes substantially parallel to a radial plane through the axis of the body, said attaching surface having a series of intersecting grooves dividing the surface into a series of spaced projections, and a tip of relatively hard material overlying said projections and attached thereto.

8. A cutting tool including a disc-like body having a series of angularly spaced teeth thereupon, a series of generally parallel circumferential grooves in said body extending into said teeth, said teeth having a series of transversely extending grooves therein extending in parallel relation into one side of each tooth, and a tip of relatively hard material secured to said one side of each of said teeth overlying said circumferential and transversely extending grooves.

References Cited in the file of this patent

UNITED STATES PATENTS

| | | |
|---|---|---|
| 1,399,219 | Lipps | Dec. 6, 1921 |
| 1,950,354 | DeBats | Mar. 6, 1934 |
| 1,974,215 | Kilmer | Sept. 18, 1934 |
| 2,044,853 | Laise | June 23, 1936 |
| 2,070,156 | DeBats | Feb. 9, 1937 |

FOREIGN PATENTS

| | | |
|---|---|---|
| 386,324 | Great Britain | Jan. 10, 1933 |